Patented Mar. 15, 1949

2,464,201

UNITED STATES PATENT OFFICE 2,464,201

ISOMERIZATION OF HYDROCARBONS AND IMPROVED CATALYSTS THEREFOR

John W. Latchum, Jr., Bartlesville, Okla., assignor to Phillips Petroleum Company, a corporation of Delaware No Drawing. Application December 31, 1943, Serial No. 516,535

31 Claims. (Cl. 260—683.4)

This invention relates to the conversion of organic materials, for example, hydrocarbons. The invention has particular application to the conversion of paraffinic hydrocarbons. A specific embodiment of the invention relates to an improved metal halide catalyst useful in organic conversions.

Normal paraffins can be isomerized to branched-chain paraffins by contact with an aluminum halide catalyst or other metal halide of the Friedel-Crafts type under suitable conditions, and branched-chain or iso-paraffins can be alkylated with olefins to produce higher isoparaffins which constitute high octane number gasoline boiling range fuels, likewise by contact with aluminum halide or other Friedel-Crafts type metal halide catalysts under suitable conditions. For example, normal butane, when contacted with aluminum chloride or aluminum bromide at an elevated temperature, undergoes conversion to isobutane, and when a large molecular excess of isobutane is contacted with ethylene or other lower olefin at normal or slightly elevated temperatures in the presence of aluminum chloride or aluminum bromide, the isobutane combines with ethylene or other olefin to produce a mixture of higher isoparaffinic hydrocarbons boiling within the gasoline boiling point range and having a high octane number. It is conversions of this type to which the present invention is particularly applicable.

Catalysts such as the halides of aluminum, beryllium, boron, zinc, titanium, tin, zirconium, iron, antimony, and other polyvalent metal halides, generally known as Friedel-Crafts type metal halides, have also been used in carrying out various other organic conversions; the alkylation of aromatic hydrocarbons, the cracking of hydrocarbons, the polymerization of unsaturated hydrocarbons, the disproportionation of hydrocarbons, the reaction of phenols with tertiary alkyl halides or alcohols, may be mentioned as examples. The present invention provides improved catalysts which may also be used in carrying out the various organic conversions which may be catalyzed by previously known metal halide catalysts.

The present invention has particular application in the isomerization of saturated hydrocarbons, which may be exemplified by the conversion of normal butane to isobutane, normal pentane to isopentane, methyl cyclopentane to cyclohexane, dimethyl cyclopentane to methyl cyclohexane, etc. The reverse of these isomerizations may also be effected, although there is seldom a commercial demand for such conversions. Ordinarily, then, the inventions in a preferred embodiment will involve a conversion of straight-chain paraffins to branched-chain paraffins or of branched-chain paraffins to more highly branched-chain paraffins by isomerization reactions.

The isomerization of normal butane to produce isobutane in the presence of aluminum chloride catalyst activated with hydrogen chloride has become an important commercial process, and my invention is particularly applicable to this process and will be described with especial reference thereto. In the past, aluminum chloride has been used per se, ordinarily in the form of relatively large lumps. The aluminum chloride has also been used successfully in combination with solid supporting materials such as pumice, charcoal, fuller's earth, "Porocel" (a commercially available low-iron-content bauxite), silica gel, porcelain, etc. Certain of these supports appear to be completely inert in so far as aluminum chloride is concerned, while others are believed to have a definite promoting action, thereby producing catalysts considerably more active than those involving the inert materials referred to. In some cases the catalyst combination is prepared outside the reaction zone, while in others it is prepared in situ by methods which may involve sublimation of aluminum chloride onto the carrier material and/or adsorption of aluminum chloride vapors by an adsorptive support or carrier from a gas containing such vapors in minor amounts.

In the use of aluminum chloride or other volatile halide catalysts, considerable difficulty has been encountered due to the volatilization or solution of catalysts in vaporous or liquid reactants whereby catalyst is carried out of the reaction zone by the effluent reaction mixture. It has been proposed to prevent the carry-over of aluminum chloride in vaporous isomerization effluents by passing the same through a bed of adsorptive alumina, the object being to absorb residual aluminum chloride vapors. One aspect of my invention relates to removal of such catalysts from gaseous or liquid streams.

It is an object of my invention to effect organic reactions.

It is a further object to convert saturated hydrocarbons.

Another object is to effect the conversion of paraffin hydrocarbons into other, branched-chain paraffin hydrocarbons.

A further object is to effect the isomerization of normal butane in the presence of a novel catalyst comprising an aluminum halide, such as aluminum chloride.

A further object is to provide a new, highly active metal halide catalyst useful for carrying out organic conversions.

Yet another object is to provide a means for recovering residual sublimed aluminum chloride from a vaporous isomerization effluent.

Further objects and advantages of the invention will be apparent to one skilled in the art from the accompanying disclosure and description.

I have found that acid salts of the nature of sodium acid sulfate ($NaHSO_4$) may be combined with an aluminum halide or other Friedel-Crafts type metal halide to form an especially active catalyst. The aluminum halide or the like may be present as only a very minor proportion of the catalyst mass. For example, less than 10 per cent aluminum chloride in combination with sodium acid sulfate provides a catalyst which is highly desirable and effective in the isomerization of normal butane. One preferred method of preparing such a catalyst is to pass over a body of granulated sodium acid sulfate a stream of hydrocarbon or other vapors carrying sublimed aluminum chloride therein. The sodium acid sulfate apparently has considerable affinity for the aluminum chloride and adsorbs the same from the vapor stream referred to. In this manner I have prepared a catalyst containing even less than 3 weight per cent aluminum chloride, which I have found to be as active or more active than a number of other catalysts commonly accepted as being among the most active isomerization catalysts known. Of course, the novel catalysts of my invention may be prepared by many other methods known to the art but the method just described is preferred inasmuch as a convenient method of working is had and a very small amount of the expensive aluminum halide is used in preparing a catalyst of given activity. Among the other possible methods may be mentioned: admixture of sodium acid sulfate with molten aluminum chloride, admixture of powdered aluminum chloride with powdered sodium acid sulfate followed by partial fusion and/or pelleting of the mixture, etc. As examples of other acid salts which may be used in place of sodium acid sulfate may be mentioned potassium acid sulfate, other alkali metal acid sulfates, di-basic and mono-basic sodium acid phosphate ($Na_2HPO_4$ and $NaH_2PO_4$, respectively), mono-barium ortho-phosphate ($BaH_4(PO_4)_2$), sodium bi-carbonate ($NaHCO_3$), etc. Of course it is required that the acid salt be stable under the conditions of manufacture and use of the catalyst. It may be postulated that some sort of loose chemical combination exists between the metal halide and the acid salt. It is believed probable that the presence of the acidic or replaceable hydrogen atom together with another positive atom or ion is the essential factor characterizing the materials which may be combined with aluminum halide or the like to form the catalysts of this invention. However, I do not need nor wish to be bound by any particular theory of possible chemical interaction between the metal halide and the acid salt, and hence content myself with the observance that a very desirable and active catalyst may be prepared by associating the two types of materials. It will of course be appreciated that while all the catalysts of my invention have certain characteristics in common, the various different specific catalysts contemplated will not necessarily be full equivalents under all circumstances. While I generally prefer to use the substantially anhydrous acid salts, those having a water of crystallization may also be used successfully.

In preferred practice of my invention, sodium acid sulfate in any desired form and from any suitable source is utilized. For example, it may be readily obtained commercially in the form of a fine powder, small granules, or relatively large lumps. I have obtained satisfactory results in using a commercial nitre-cake of high purity (95% $NaHSO_4$) and also with a less pure nitre-cake (80% $NaHSO_4$). In considering the advantages of my novel catalyst it may well be emphasized that nitre-cake may be obtained at the present time at a cost of about two dollars per ton.

To illustrate and exemplify the invention in a preferred form, the vapor phase isomerization of normal butane will be described. In one manner of operating, two catalyst chambers are provided, the first containing lump anhydrous aluminum chloride and the second containing lump nitre-cake. A stream of normal butane is heated to about 200° F. and anhydrous hydrogen chloride is added to produce a mixture containing 5 mol per cent hydrogen chloride. The resulting stream is passed through the first chamber wherein conversion to isobutane occurs to the extent of say 10 to 20 per cent. A small amount of aluminum chloride is also vaporized under these conditions and is present in the effluent stream from the first chamber. This stream is next passed through the second chamber containing nitre-cake, and when first put into operation the aluminum chloride is substantially completely adsorbed from the gas stream passing therethrough. The resulting aluminum chloride-free isomerization effluents are then passed to conventional separation steps for recovery of the isobutane product, and recycle hydrogen chloride and normal butane streams. It will be seen that by this operation a complete removal of volatilized aluminum chloride is effected. Accordingly, portions of the equipment downstream of the secondary chamber may be operated without an undesirable condensation of aluminum chloride therein. At first very little or no conversion occurs in the secondary chamber; however, after a relatively short induction period which may usually range from a few hours up to about a day, depending upon the conditions used, sufficient aluminum chloride is adsorbed by the nitre-cake to produce a catalytically active mass in the secondary chamber. Quite unexpectedly, this catalytic activity usually appears when the aluminum chloride content of the entire mass is still below about one weight per cent. The effluent vapors from the secondary chamber ordinarily remain free of aluminum chloride until the aluminum chloride content of the catalyst in the secondary chamber reaches at least several per cent. After the short induction period mentioned, substantial further conversion of normal butane to isobutane occurs in the secondary chamber, so that an effluent containing, for example, from 30 to 60 per cent isobutane is readily obtainable. When the effluents from the secondary chamber are no longer free from aluminum chloride the stream may be passed through a fresh bed of nitre-cake to prevent aluminum chloride carry-over. Aluminum chloride vapors, however, may still be introduced into the secondary chamber continuously or intermittently to maintain the catalytic activity thereof and to make up for loss of AlCl₃ in the effluents. The catalyst may thus be used for a long period of time. A bed of nitre-cake may advantageously be used first to remove aluminum chloride from effluents and then as a catalyst. With suitable modifications, based on the nature of the materials in question, operations similar to those described in United States Patent 2,281,924 wherein adsorptive alumina is used, may be carried out using sodium acid sulfate in accordance with my invention. It may be noted here that sodium acid sulfate becomes catalytically active for isomerization when it has an aluminum chloride content far below the 10 per cent mentioned in this patent. Other methods of combining the property of adsorbing aluminum chloride from vapors and the property of being catalytically active will readily occur to one skilled in the art. Merely as another example, a series of steps somewhat similar to some of those disclosed in United States Patent 2,323,830 may be employed.

As a specific example of the practice of my invention the following data are provided. Inasmuch as these data represent results obtained under only the given sets of conditions, it will be appreciated that the invention is of wider scope, and that the examples accordingly are not to be construed as unduly limiting the invention. Isomerization, alkylation and other conversions may be effected with the aid of my catalysts at temperature and pressure conditions conventional for such conversions when carried out with other metal halide catalysts.

*Example I*

A catalyst chamber was filled with a finely powdered commercial nitre-cake, containing 94.2 per cent sodium acid sulfate and 2.5 per cent moisture by analysis. The effluent from a primary isomerization chamber comprising normal butane, isobutane, vaporized aluminum chloride, and hydrogen chloride was passed through the secondary chamber containing the nitre-cake at about 200° F. and 190 pounds per square inch gauge. During the first day of operation a conversion of five per cent per pass was realized, representing an appreciable conversion after only a short period of operation. Other supporting materials tested under similar conditions had induction periods (no conversion obtained) of two days or longer.

*Example II*

A secondary catalyst chamber was filled with 4–14 mesh sodium acid sulfate. The effluent from a primary isomerization chamber was passed through this secondary chamber at a space velocity of 900 volumes (standard conditions) per volume of catalyst per hour. A pressure of 175 pounds gage and an average temperature of 190° F. were maintained. The vapors (on an AlCl₃-free basis) comprised 16 per cent isobutane, 81 per cent normal butane and 3 per cent hydrogen chloride. Effluent vapors contained 40.5% isobutane, representing a per-pass conversion of 23.5 per cent. By way of comparison, in runs made under similar conditions and with similar equipment, activated charcoal gave a per-pass conversion of 11 per cent, fuller's earth gave a per-pass conversion of 3.5% and pumice gave no conversion. The tests on these various materials were not on a strictly equivalent basis due to some variations in flow rates and in temperature, but the conditions for each test closely approximated those used for the sodium acid sulfate test, and the results shows conclusively the high activity of the sodium acid sulfate-aluminum chloride catalyst.

*Example III*

A catalyst prepared by intimately admixing potassium acid sulfate with 10 per cent by weight of anhydrous aluminum bromide may be used for the liquid-phase alkylation of isobutane with ethylene, propylene, or butylenes using a small percentage of anhydrous hydrogen bromide in the reaction mixture. Preferably the finely divided catalyst is agitated in the liquid reaction mixture. In the case of the ethylene-isobutane reaction, a high yield of diisopropyl is obtained.

While I have described various aspects of my invention with particular reference to an AlCl₃—NaHSO₄ combination, it will be appreciated that other compositions of the nature described may, with suitable modifications, be made and used without departing from the spirit and scope of the invention.

I claim:

1. A process for the conversion of normal butane to isobutane which comprises passing a gaseous stream containing normal butane and catalyst-activating amounts of hydrogen chloride through a bed of solid aluminum chloride at isomerization conditions of temperature and pressure whereby isobutane is produced and aluminum chloride vapors are incorporated in said stream, and passing the resulting stream through a bed of sodium acid sulfate at isomerization conditions of temperature and pressure whereby aluminum chloride from said stream becomes incorporated in said bed and further amounts of isobutane are produced.

2. The process of claim 1, in which said stream after contact with said bed of sodium acid sulfate contains residual aluminum chloride and is passed through an additional amount of fresh sodium acid sulfate whereby substantially all said residual aluminum chloride vapors become associated with said fresh sodium acid sulfate, and recovering isobutane from the resulting aluminum chloride-free stream as a product of the process.

3. A process which comprises passing vapors of a saturated hydrocarbon, containing a vaporized Friedel-Crafts type metal halide which it is desired to remove, into contact with a solid acid salt of a polybasic acid having a replaceable hydrogenation atom under conditions effecting adsorption of said metal halide by said acid salt, and, when said acid salt becomes incapable of effecting such adsorption to a desired extent, utilizing same as a catalyst to effect isomerization of isomerizable saturated hydrocarbons.

4. A process for the conversion of normal butane to isobutane which comprises passing a gaseous stream containing normal butane into contact with an aluminum halide at elevated temperatures to incorporate vapors of aluminum halide in said stream, and passing the resulting stream at isomerization conditions of temperature and pressure into contact with an alkali metal acid sulfate having a minor amount of aluminum halide associated therewith and in the presence of catalyst-activating amounts of the corresponding hydrogen halide to effect isomerization of said normal butane to isobutane.

5. The process of claim 4, in which said aluminum halide is aluminum chloride and said hydrogen halide is hydrogen chloride.

6. The process of claim 4, in which said alkali metal acid sulfate is sodium acid sulfate.

7. The process of claim 4, in which said alkali metal acid sulfate is sodium acid sulfate, said aluminum halide is aluminum chloride, and said hydrogen halide is hydrogen chloride.

8. A process which comprises isomerizing normal butane to isobutane in the presence of a catalyst comprising sodium acid sulfate and aluminum chloride.

9. A process for converting saturated hydrocarbons into other, branched-chain saturated hydrocarbons, which comprises contacting a reaction mixture comprising saturated hydrocarbons at reaction conditions converting same into other, branched-chain saturated hydrocarbons, with a catalyst comprising an acid salt of a polybasic acid having a replaceable hydrogen atom and a Friedel-Crafts type metal halide.

10. The process of claim 9, in which said catalyst is a mixture of a major proportion of sodium acid sulfate with a minor proportion of aluminum chloride.

11. The process of claim 9, in which said reaction mixture comprises alkylatable paraffin hydrocarbons as said saturated hydrocarbons and olefins, and in which said reaction conditions effect the conversion of said saturated hydrocarbons by alkylation reaction into higher boiling branched-chain high octane number motor fuel range hydrocarbons as said other, branched-chain saturated hydrocarbons.

12. A method of removing metal halides from fluids containing the same which comprises passing such fluids into contact with a solid acid salt of a polybasic acid having a replaceable hydrogen atom whereby metal halide is adsorbed from said fluid by said salt.

13. In organic conversion processes employing a Friedel-Crafts type metal halide catalyst, the improvement which comprises employing a catalyst comprising such a metal halide in intimate admixture with sodium acid sulfate.

14. A catalyst comprising a Friedel-Crafts type metal halide and a solid acid salt of a polybasic acid having a replaceable hydrogen atom.

15. A solid catalyst comprising a major proportion of a solid acid salt of a polybasic acid having a replaceable hydrogen atom and a minor proportion of an aluminum halide.

16. A catalyst useful in effecting organic conversions which comprises sodium acid sulfate plus a Friedel-Crafts type metal halide catalyst.

17. An improved aluminum chloride catalyst comprising aluminum chloride in admixture with nitre-cake.

18. An improved aluminum chloride catalyst comprising aluminum chloride in admixture with sodium acid sulfate and a catalyst activating amount of hydrogen chloride.

19. As a new composition of matter, a solid metal salt of a polybasic acid having a replaceable hydrogen atom, and having admixed therewith a Friedel-Crafts type metal halide adsorbed from a gas containing vapors of the anhydrous metal halide.

20. The method of removing a volatile metal halide from a non-aqueous fluid containing same, which comprises contacting said fluid with an alkali metal acid sulfate.

21. The method of removing a volatile metal halide from a non-aqueous fluid containing same, which comprises contacting said fluid with an alkali metal acid sulfate, removing the treated fluid containing hydrogen halide, and separating the hydrogen halide from the treated fluid.

22. The method of removing a volatile metal halide from a hydrocarbon fluid containing same, which comprises contacting said hydrocarbon fluid with an alkali metal acid sulfate.

23. The method of removing a volatile metal halide from a hydrocarbon fluid containing same, which comprises contacting said hydrocarbon fluid with an alkali metal acid sulfate, removing the treated hydrocarbon fluid containing hydrogen halide, and separating the hydrogen halide from the treated hydrocarbon fluid.

24. The method of removing aluminum chloride from hydrocarbon vapor containing same, which comprises contacting said vapor with sodium acid sulfate.

25. The method of removing aluminum chloride from hydrocarbon vapor containing same, which comprises contacting said vapor with sodium acid sulfate, removing the treated vapor containing hydrogen chloride, and separating the hydrogen chloride from the treated vapor.

26. The method of removing aluminum chloride from a vaporous mixture including isobutane, which comprises contacting said vaporous mixture with sodium acid sulfate.

27. The method of removing aluminum chloride from a vaporous mixture including isobutane, which comprises contacting said vaporous mixture with sodium acid sulfate, removing the treated vaporous mixture containing hydrogen chloride, and separating the hydrogen chloride from the treated vaporous mixture.

28. The method of removing a volatile metal halide from a non-aqueous fluid containing same, which comprises contacting said fluid with an alkali metal acid sulfate to remove said volatile metal halide and form a substantially metal halide-free fluid, and withdrawing said metal halide-free fluid from contact with said sulfate.

29. The method of removing a volatile metal halide from a non-aqueous fluid containing same, which comprises contacting said fluid with an alkali metal acid sulfate under conditions removing from said fluid said volatile metal halide by action of said alkali metal acid sulfate thereon.

30. The method of removing aluminum chloride from a non-aqueous fluid containing same, which comprises contacting said fluid with an alkali metal acid sulfate.

31. A process for the conversion of hydrocarbons which comprises passing a stream of said hydrocarbons through a bed of solid aluminum chloride at conversion conditions whereby hydrocarbon conversion is effected and aluminum chloride becomes incorporated in said stream, and passing the resulting stream through a bed of an alkali metal acid sulfate at conversion conditions whereby aluminum chloride from said stream becomes incorporated in said bed and further hydrocarbon conversion is effected.

JOHN W. LATCHUM, Jr.

REFERENCES CITED

The following references are of record in the file of this patent:

UNITED STATES PATENTS

| Number | Name | Date |
|---|---|---|
| 2,324,746 | Weinrich et al. | July 20, 1943 |
| 2,328,707 | Clar et al. | Sept. 7, 1943 |
| 2,344,467 | Reeves | Mar. 14, 1944 |
| 2,346,012 | Danforth | Apr. 4, 1944 |
| 2,346,768 | Laughlin | Apr. 18, 1944 |
| 2,366,736 | Linn et al. | Jan. 9, 1945 |

Certificate of Correction

Patent No. 2,464,201. March 15, 1949.

JOHN W. LATCHUM, Jr.

It is hereby certified that error appears in the printed specification of the above numbered patent requiring correction as follows:

Column 6, lines 53 and 54, claim 3, for the word "hydrogenation" read *hydrogen*; and that the said Letters Patent should be read with this correction therein that the same may conform to the record of the case in the Patent Office.

Signed and sealed this 30th day of August, A. D. 1949.

[SEAL]

THOMAS F. MURPHY,
*Assistant Commissioner of Patents.*